(12) United States Patent
Ratte et al.

(10) Patent No.: US 7,338,539 B2
(45) Date of Patent: Mar. 4, 2008

(54) DIE CAST BATTERY TERMINAL AND A METHOD OF MAKING

(75) Inventors: Robert W. Ratte, North Oaks, MN (US); Norman E. Peterson, Wyoming, MN (US)

(73) Assignee: Water Gremlin Company, White Bear Lake, MN (US)

( * ) Notice: Subject to any disclaimer, the term of this patent is extended or adjusted under 35 U.S.C. 154(b) by 708 days.

(21) Appl. No.: 10/804,401

(22) Filed: Mar. 18, 2004

(65) Prior Publication Data
US 2005/0147881 A1    Jul. 7, 2005

Related U.S. Application Data

(60) Provisional application No. 60/533,924, filed on Jan. 2, 2004.

(51) Int. Cl.
*H01M 6/00*    (2006.01)
(52) U.S. Cl. ......................... 29/623.1; 164/47
(58) Field of Classification Search ............... 29/623.1, 29/623.2, 623.5; 429/178, 181; 164/47, 164/464, 483
See application file for complete search history.

(56) References Cited

U.S. PATENT DOCUMENTS 5,316,505 A * 5/1994 Kipp ........................ 439/762
6,644,084 B1 * 11/2003 Spiegelberg ................. 72/126
2003/0224248 A1   12/2003 Spiegelberg et al. ......... 429/178
2005/0147882 A1 * 7/2005 Ratte et al. .................. 429/178
2006/0127693 A1 * 6/2006 Peslerbe et al. ............ 428/650

FOREIGN PATENT DOCUMENTS

| DE | 3942175 A1 | 6/1991 |
|---|---|---|
| DE | 4127956 | 2/1993 |
| DE | 4127956 A1 | 2/1993 |
| DE | 4241393 C1 | 7/1994 |
| EP | 0601268 A1 | 6/1994 |
| EP | 0601268 B | 6/1994 |
| EP | 0601268 B1 | 6/1994 |
| GB | 1236495 | 6/1971 |
| GB | 1245255 | 9/1971 |
| JP | 56-159054 B | 12/1981 |
| JP | 56159054 | 12/1981 |

* cited by examiner

*Primary Examiner*—Raymond Alejandro
(74) *Attorney, Agent, or Firm*—Perkins Coie LLP

(57) ABSTRACT

A battery part such as a battery terminal and method of making the same with the battery part having a sealing region or sealing bead located on a lateral face of the acid ring with the beveled sealing region increasing the resistance to leakage therepast as the container shrinks. Another embodiment of the invention comprises a battery part with a bifurcated acid ring end and a beveled end face. The invention further includes the method of forming a battery terminal with an end face of the acid ring having a bifurcated end lip and a beveled face that permits one to either use the battery terminal in an as is condition or in a flared condition wherein a lip on the acid ring is flared to form a beveled sealing region on the lateral face of the acid ring.

16 Claims, 6 Drawing Sheets

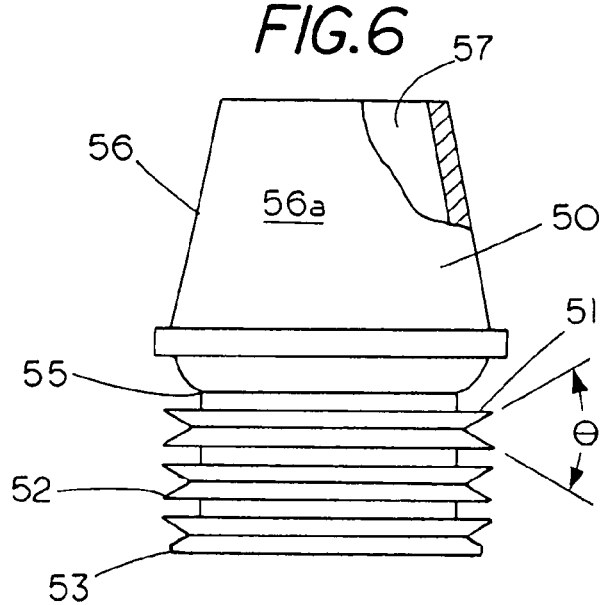
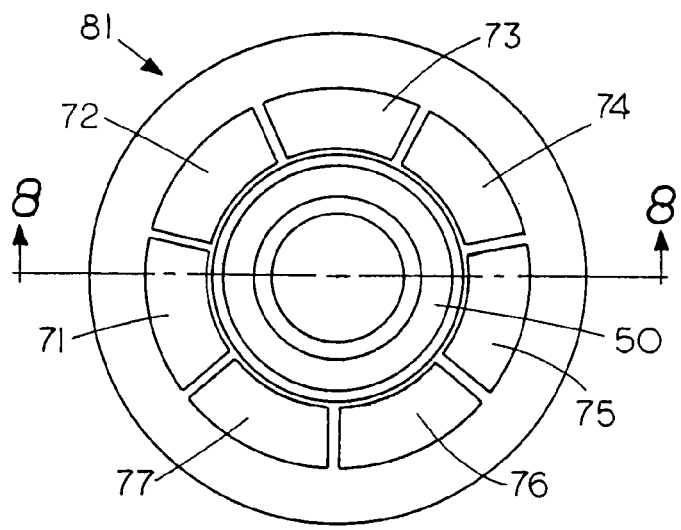
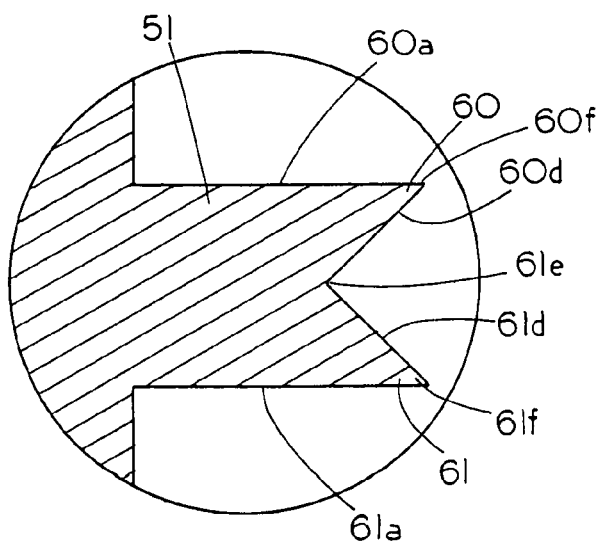

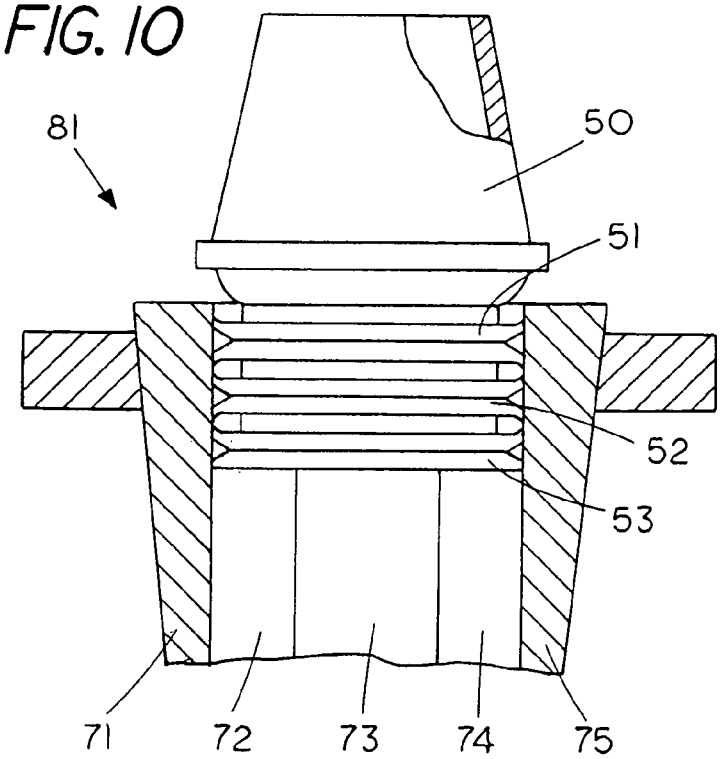
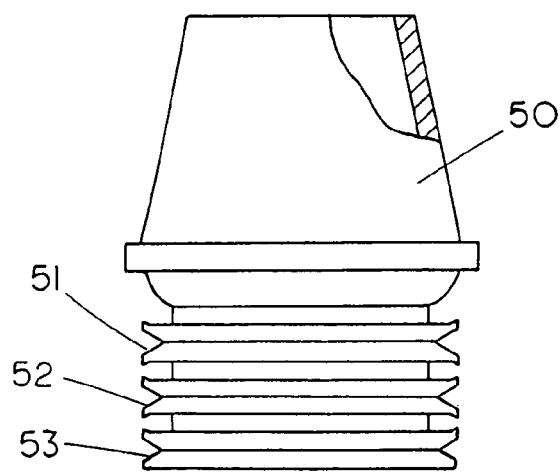
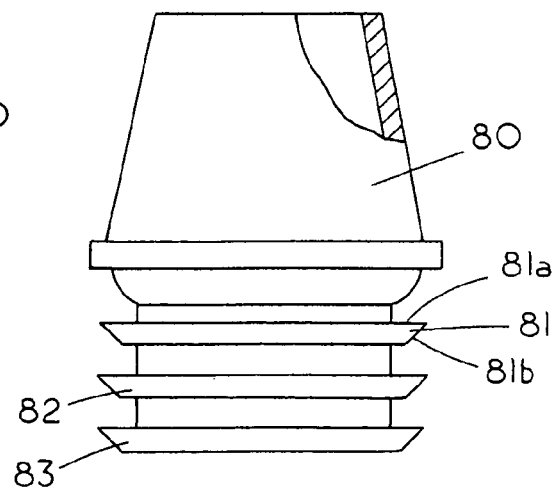

DIE CAST BATTERY TERMINAL AND A METHOD OF MAKING

CROSS REFERENCE TO RELATED APPLICATIONS

This application claims priority from provisional application Ser. No. 60/533,924 filed Jan. 2, 2004 titled Battery Part and Method of Making.

FIELD OF THE INVENTION

This invention relates generally to battery parts and, more specifically, to a battery part and a method of flaring an acid ring to form an enhanced sealing region with minimized opportunities for stress cracks in the battery part.

STATEMENT REGARDING FEDERALLY SPONSORED RESEARCH OR DEVELOPMENT

None

REFERENCE TO A MICROFICHE APPENDIX

None

BACKGROUND OF THE INVENTION

Battery parts such as battery terminals, which are typically cold formed or die cast, are normally secured to a container with a portion of the battery terminal located inside the container and a further portion located outside the container. The battery containers, which are typically plastic such as polyethylene, are molded around a set of acid rings that are located on the portion of the terminal that is located within the container. The acid rings provide an extended interface and consequently a tortuous path to inhibit or prevent electrolyte from escaping from the battery container. Because the acid must follow an extended interface to escape this type of sealing, with a set of concentric acid rings, is often referred to as a labyrinth seal.

Because the battery terminals are cast or cold formed the radially protruding acid rings are generally formed with either a rectangular cross sectional shape or a slight outward taper to facilitate removal of the battery terminals from the mold.

While battery terminals have a generally rectangular cross sectional shape are used extensively other shaped acid rings have been used in order to prevent the plastic container from shrinking away from the terminal and upsetting the interface between the battery part and the container which could cause leakage of electrolyte. Generally, these type of acid rings provide lateral engagement between the acid ring and the container.

For example, the 1971 United Kingdom patent specification GB 1236495 discloses a battery terminal wherein two acid ring are bent toward each other to provide a dovetail shaped gap that extends along the entire length of the acid ring so that it enables the two adjacent acid rings to form a dovetail joint with the battery container and thereby provide lateral engagement between the acid ring and the container.

The 1971 United Kingdom patent specification GB 1,245,255 discloses three acid rings that have been deformed to create a dovetail shaped gap between adjacent acid rings with the dovetail gap extending along the entire length of the acid ring to form two dove tail joints with the container and thereby provide lateral engagement between the acid ring and the container. In this embodiment the acid rings are compressed sufficiently to deform the acid rings so that the acid ring tapers inwardly along the entire length of the ring, that is from the circumferential edge of the acid ring to the base of the acid ring.

The 1981 Japanese patent JP56159054 discloses a further embodiment wherein the battery terminal acid rings are deformed along the entire length of the acid ring to form inclined projections on the acid rings that engages the cover to provide effective liquid tightness and thereby provide lateral engagement between the acid ring and the container.

The 1993 Hofmann German patent DE 4127956 A1 discloses a battery terminal wherein the ends of the acid rings have been rounded and the lower acid ring has been provided with a wedge shaped profile to increase the sealing effect with a container and thereby provide lateral engagement between the acid ring and the container.

The 1994 Hofmann German patent DE 4241393 C1 discloses a battery terminal wherein the ends of the acid rings have been rounded and a barb or undercut that forms a hook which is located on the back side of the acid ring. The "hook" on the back side of the deformed acid ring hooks into the plastic container i.e. to lateral restrain the container to prevent the plastic battery container material from shrinking away from the battery terminal. In addition, a further embodiment is disclosed wherein adjacent acid rings are of the same thickness but are angled away from each other in order to laterally restrain the container with respect to the acid rings.

The 1992 Hofmann European patent 0 601 268 B1 discloses a battery terminal wherein the ends of the acid rings either have a rounded end or a triangular shaped end with a barb or hook on the back side of the acid ring. This "hook" on the back side of the deformed acid ring hooks the plastic to prevent the plastic battery container material from shrinking away from the battery terminal by laterally restraining the container with respect to the acid rings.

The 1992 Hofmann European patent application 0 601 268 A1 also discloses the battery terminal wherein the ends of the acid rings either have a rounded end or a triangular shaped end with a barb or undercut or hook on the back sides of the acid ring. In addition, a further embodiment of an acid ring is disclosed wherein two adjacent acid rings, which are of the same thickness, are angled away from each other to laterally restraining the container with respect to the acid rings by forming a dovetail like joint.

The 1989 Hofmann German patent application DE 3942175A1 discloses a method of forming a battery terminal with acid rings by cold rolling the terminal to form the circumferential acid rings.

U.S. Pat. No. 6,644,084 Speigelberg describes a process of forming an acid ring with a hook by first deforming the battery terminal from a rectangular shaped acid ring to an arrowhead shaped acid ring. The transformation to the hook shape is obtained by rotating the battery terminal relative to a cold forming roller to deform an acid ring with a rectangular cross section into an acid ring having an undercut or overhang. The cold rolling process involves substantial deformation of the acid ring on the cast battery part in order to produce the hook for engaging the battery container.

While the prior art provides acid rings with rectangular shapes that are either bent or transformed into a different shape by cold rolling to form a lateral restraint between the battery container and the terminal. The lateral restraint is obtained by either forming a hook on the acid ring or forming a dovetail or dovetail like engagement between the battery container and the battery terminal.

In contrast to the prior art acid rings, where the shape of the acid ring is substantially altered, in the present invention one can cast a battery part with the acid ring having a bifurcated end separated by a circumferential grove or an end with a single annular tapered lip. The bifurcated end results in two outwardly extending annular lips on each acid ring. The annular lips on each acid ring can be flared away from each other to produce a beveled surface or sealing bead along an annular outer portion of each of the annular lips which not only laterally restrains the container with respect to the terminal but also forms an enhanced sealing region between the container and the acid ring. In addition the circuitous path provided by the bifurcated acid rings can increase the resistance to electrolyte leakage by providing a more tortuous interface between the acid rings and the container.

A further feature of the invention is the flaring of the lips can be obtained by applying a radial compressive force to the bifurcated ends of the acid ring. Since only the bifurcated ends of the acid ring are flared it substantially eliminates problems that can occur with prior art cold forming deformation of a pressure cast battery terminal. That is, an interface between a die cast portion of battery terminal and a cold rolled portion of the battery terminal can lead to cracks or stress areas between the cast region and the cold formed region of the battery part, which can be subject to electrolyte leakage therethrough. By minimizing the interface one can minimize the opportunity for leakage.

Thus the flaring of the lips on the bifurcated acid ring of the present invention produces a back flare sealing region that extends circumferential around the terminal which not only enhances sealing but also restrains lateral engagement between the container and the acid rings and at the same time minimizing the occurrences of fractures or stress cracks in metal that has a portion of the original die cast shape altered by cold rolled deformation.

The present invention provides a battery part that eliminates the substantial deformation or acid ring transformation necessary to either form an under cut or overhang on the acid ring or to deform an acid ring along its entire length to form a dovetail engagement as shown in GB 1236495; GB 1,245,255; JP 5619054 and EPO 06012681A1. In addition, the present invention further eliminates the need to mechanically deform the acid ring from a rectangular shape to an arrow head shaped acid ring or to an acid ring with a hook or an acid ring with a beveled surface that extends along the entire length of the acid ring as shown in EP006012681B1 and DE4241393;

Thus, by flaring the lip or lips on the circumferential end of the acid ring one can form annular sealing regions, laterally restrain the container with respect to the acid ring, and inhibit electrolyte from escaping from the battery container with a more tortuous path. Not only does the present invention inhibit escape of electrolyte by providing a circumferential sealing ring it also make it easier to flow the plastic around the acid ring since the flared lip extends along only a portion of the acid ring. In addition, the present process minimizes stress produced in the battery part when a substantial part of a die cast battery terminal is subsequently transformed to a substantially different shape by cold rolling since the lips on the end of the acid ring can be flared instead of mechanically deformed into an entirely different shape.

SUMMARY OF THE INVENTION

Briefly, the invention comprises a battery part such as a battery terminal with the battery part having an inclined sealing region or sealing bead located on a lateral face of the acid ring with the sealing region increasing the resistance to leakage therepast as the container shrinks. Another embodiment of the invention comprises a battery part with a bifurcated acid ring end and a beveled end face. The invention further includes the method of forming a battery terminal with an end face of the acid ring having a bifurcated end and a beveled face that permits one to use the battery terminal in an as is condition or in a flared condition wherein the lips on the bifurcated end of the acid ring can be flared to form a beveled sealing region that functions like an "O-ring" on the backside of the lip of the acid ring.

BRIEF DESCRIPTION OF THE DRAWINGS

FIG. 6 is a partial side view of a battery terminal having a set of acid rings with a valley or groove in the end face of the acid rings;

FIG. 7 is a top view of the battery terminal of FIG. 8 in a collet;

FIG. 7A is a sectional side view showing the beveled surfaces and the lateral surface on an acid ring with bifurcated lips;

FIG. 10 is a partial side view of the battery terminal of FIG. 6 when the collet is in a contracted condition;

FIG. 11 is a partial side view of the battery terminal of FIG. 6 with the acid rings having been deformed by the collet; and FIG. 12 is side view of an alternate embodiment wherein the acid ring is formed with a single lip on each acid ring.

DESCRIPTION OF THE PREFERRED EMBODIMENT

Figure 1:
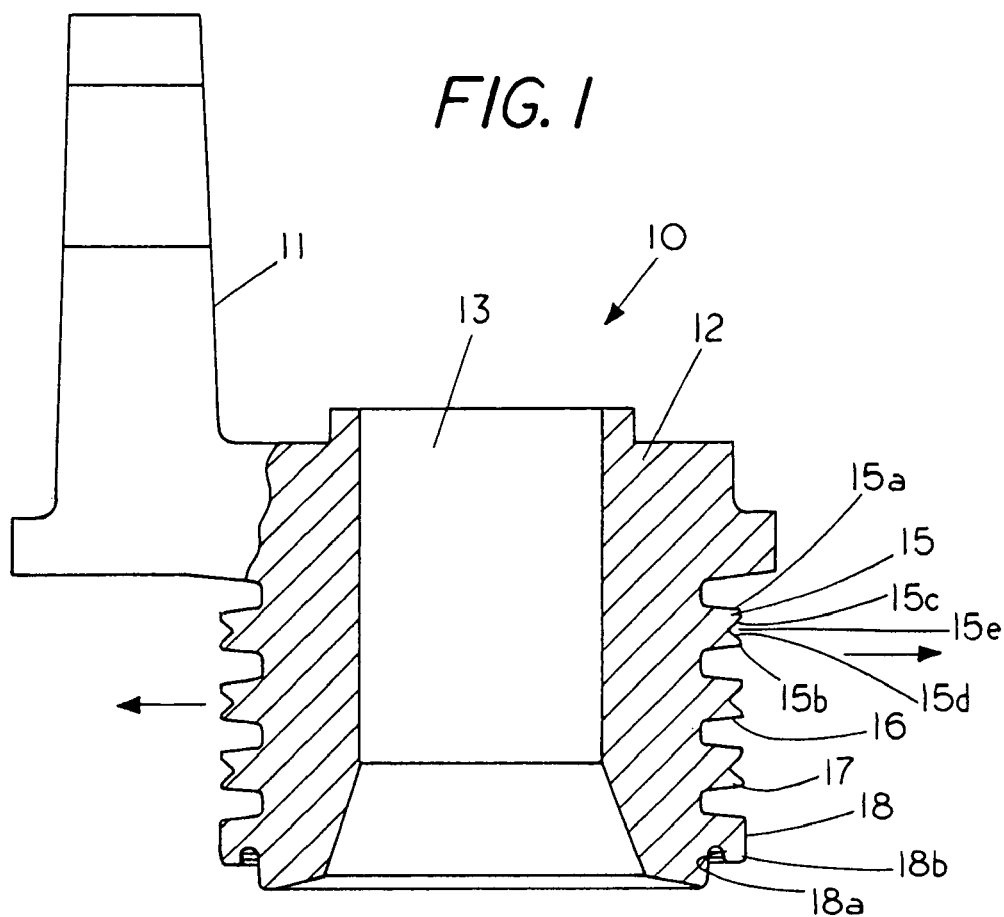
FIG. 1 is a partial cross sectional view of a battery terminal with bifurcated acid rings.

FIG. 1 shows a battery part 10 comprising a battery terminal having an upward extending lug 11 and a hollow base 12 having a central opening 13 therein. Located around the exterior of battery terminal 10 is a set of bifurcated annular acid rings 15, 16, 17, and 18 that have been formed by a die casting process. That is, a segmented mold (not shown) which radially surrounds the sides of battery part 10 during the casting process has been pulled radially away from the battery part 10 to release the battery part from the mold. Due to the configuration of the battery part and the need to pull the side mold parts radially or laterally away from the terminal the intermediate acid rings 15, 16 and 17 are oftentimes each provided with a slight tapered. Each of the acid rings 15, 16 and 17 have been cast with an annular V shaped groove located in the end of each of the acid rings. The placement of the groove in the end of acid ring generates a bifurcated circumferential end to the acid ring with each of the bifurcated ends including radially extending annular lips which are located along the opposite lateral faces of the acid rings 15, 16 and 17. Thus, a feature of the present invention is a battery terminal wherein the cast battery terminals comprising a bifurcated acid ring 15 with a die cast upper annular lip 15a and a die cast lower annular lip 15b. The end face of each of the acid rings are shown with an interior side surface or a bevel face 15c and interior side surface or a bevel face 15d that are joined at the root of the acid ring to form a V shaped annular groove 15e. Similarly, each of the bifurcated acid rings 16 and 17 have identical lips that form an apex at the root of the lips and a V shaped annular groove on the periphery of the annular acid ring.

In the embodiment shown in FIG. 1 the lower acid ring 18 is provide with an undercut 18a which can be formed by an end mold (not shown) that coacts with the side molds. That is, the end mold can be used to form the annular downward extending lip 18b since the end mold can be moved axially away from the end of the mold when the battery part is released from the mold.

Thus a feature of the present invention is the ability to cast a battery terminal wherein after the casting process has been completed at least one of the acid rings contains a lip or overhang 18b that can be used to seal the battery terminal to a battery container. Although an overhang 18 can be cast with the present process of forming bifurcated acid rings one may elect not to cast a terminal with an overhang and instead use only the flared bifurcated ends of the acid rings to maintain the sealing relationship between the container and the terminal.

Figure 2:
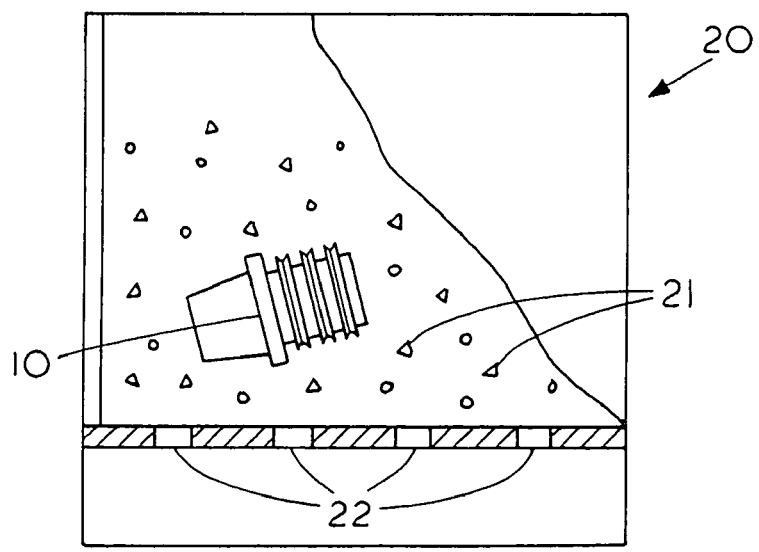
FIG. 2 is a partial cross sectional view of a chamber having a fluidized particles that impinge on a battery part therein.

FIG. 2 illustrates the battery terminal 10 located in a fluidized bed 20 having particles 21 that impinge on the exterior surfaces or beveled end face of the acid rings 15, 16 and 17 of the battery terminal through the introduction of fluid through lower openings 22. The impingement of the particles, which are preferably harder than the battery part, provide a two-fold effect. The first effect is that the particles impinging the battery part can polish the exterior surface of the battery part. The second effect is that it has been found that the impingement of particles on the beveled end surfaces of the acid ring can causes the lips of annular acid rings to fold over or flare out and create a beveled sealing region or sealing bead much like an O-ring on the lateral face of the acid rings. Thus, a feature of the present invention is that one eliminates the need to form a "hook like" connection between the battery terminal and the battery container or to deform the entire acid ring into a dovetail.

Figure 3:
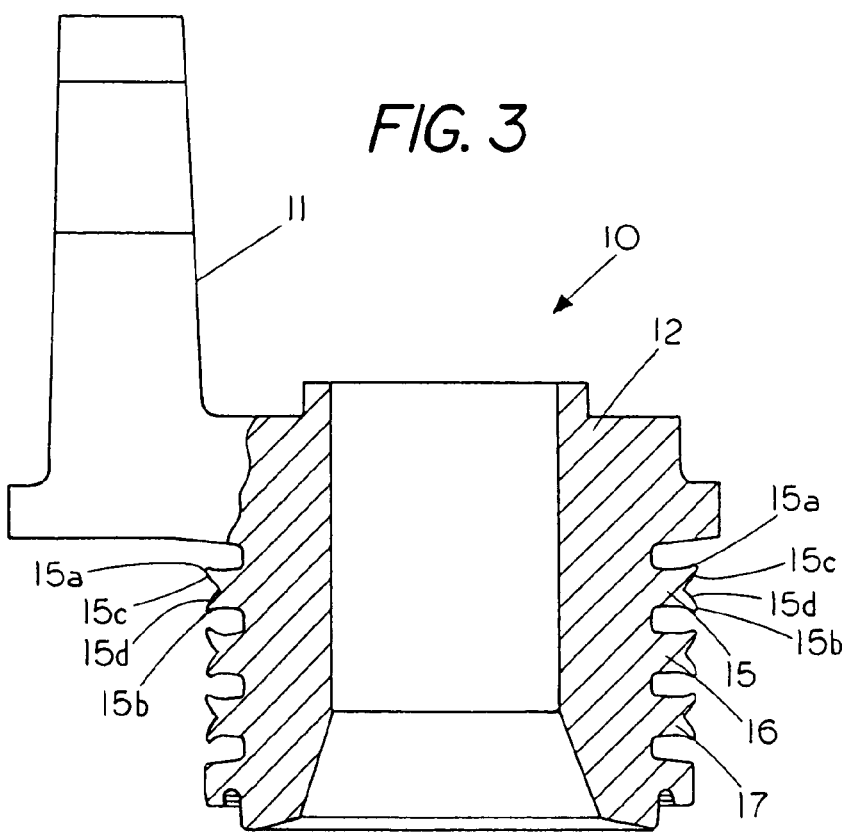
FIG. 3 is a partial cross sectional view of the battery terminal of FIG. 1 after being exposed to the fluidized media or particles as illustrated in FIG. 2.

A reference to FIG. 3 shows how battery part 10 appears after being subjected to impingement from fluidized particles. To illustrate the folding or flaring of the annular lip reference should be made to acid ring 15 which shows lip 15a curved upward and lip 15b curved downward. That is, the impingement of particles on the bevel surface 15c and 15d occurs with sufficient force so that the annular lips 15a and 15b are flared outward to thereby creating a sealing region on the backside thereof for sealing engaging and restraining a battery container without the need for forming a hook on the battery part. Since the angled surfaces 15c and 15d transmit a portion of the force in an axial direction the lip can be flared or folded outward through the radial impingement of particles on the angled surfaces 15c and 15d. As each of the bifurcated annular rings 16 and 17 have identical annular lips each of the bifurcated annular rings 16 and 17 produce a sealing region on the lateral face of the acid sealing rings for sealing engagement between container and terminal while laterally restraining a battery container with respect to the terminals without the use of a hook which could trap air therein during the formation of the container and consequently produce regions with enhanced risk of electrolyte leakage. However, if the lips are flared outward slightly to produce a sealing bead the trapped air can flow smoothly outward during the molding process and one need not be concerned with air being trapped in a "hook" on the backside of the acid ring.

While the battery part has been placed in a fluidized bed so that particles can be directed against the beveled side surface of the acid rings other methods of impinging particles against the surface such as in a tumbler where the battery part and harder media are allowed to contact the battery part as the media and the battery part are tumbled about can be used to deform the annular lips on the cast battery part. That is, in another flaring process the use of a deformable material such as a lead or lead alloy allows one can flare or bend the lips on the acid rings to the desired shape through contact of an article or particles with the angled side surfaces on the axially spaced circumferential acid rings.

Figure 4:
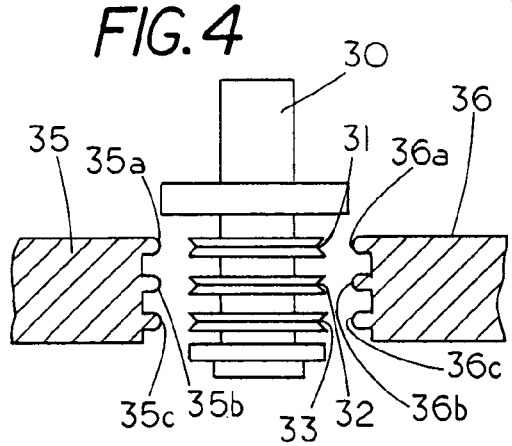
FIG. 4 is a partial side view showing radial peening members for folding over the ends of the bifurcated acid rings on a battery terminal.

FIG. 4 shows a side elevation view of a different system and method for folding or flaring the annular lips into a container engaging protrusion or sealing region on the terminal. In the embodiment shown the battery terminal 30 contains annular acid rings 31 with a V-shaped groove in the end face. A set of radially displaceable peening or flaring members 35 and 36 are positioned proximate the acid rings. In the embodiment shown the peening member 35 includes curved protrusions 35a, 35b and 35c which are located in the same plane as acid rings 31, 32 and 32. Similarly, peening member 36 includes peening protrusions 36a, 36b and 36c that are located in the same plane as acid rings 31, 32 and 33. The radial inward displacement of member 35 and 36 brings the peening protrusions into engagement with the V-shaped grooves in each of the acid rings which causes the annular lips of the acid rings to be folded outward or flared outward as illustrated in FIG. 3 to thereby form a sealing region or a rigid sealing ring on the backside of the acid ring.

Figure 5:
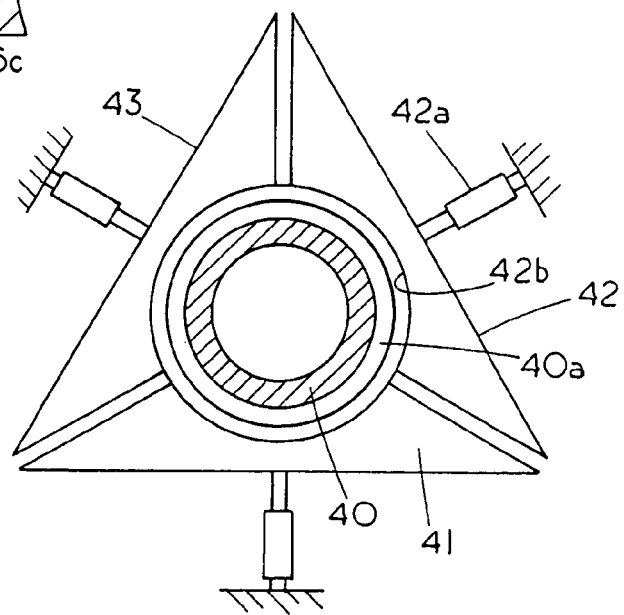
FIG. 5 is a top view of three radial peening members located around the periphery of a the a battery terminal with bifurcated acid rings.

FIG. 5 shows a bottom view of how a multiple part radial peening member can peen or compress the bifurcated acid rings so each of the acid rings have a lip or protrusion for engaging a container. In the embodiment shown, a first arcuate shaped peening member 42 which is radially positionable through a hydraulic cylinder 42a includes a peening surface 42b that is an alignment with the acid ring 40a. Similarly, positioned around terminal 40 are peening members 41 and 43 that cooperate to form a closed annular peening member that engages and folds or flares the lips on the annular acid ring backward into the hooking or container engaging protrusion illustrated in FIG. 3 by radial inward displacement of the peening members into the angled side surfaces of the annular lips on the acid ring. Thus FIG. 5 illustrates one method of forming sealing regions on the bifurcated acid rings by directing a member into the V-shaped grooves in the end faces of the bifurcated acid rings.

While the invention has been described in regard to die casting the battery terminal could also be formed from other casting methods or through cold forming.

FIG. 6 shows a preferred embodiment of the invention comprising a battery part 50 such as a battery terminal with a set of spaced bifurcated acid rings 51, 52 and 53. The bifurcated acid rings extend around the peripheral region of the battery part and can have any number of shapes including circular, hexagonal or the like. Although one acid ring can be sufficient for engagement with a battery container the battery part 50 generally includes at least three lateral spaced acid rings that extend radially outward from the base 55 of battery part 50.

Battery part 50 includes a connector lug 56 having an exterior surface 56a for forming an electrical connection to an external device. In the embodiment shown the battery terminal 50 includes a hollow central opening 57 to permit one to pour molten metal therein to form an electrical connection to an internal battery components such as a battery plate or the like.

FIG. 7A shows an isolated view of a portion of bifurcated acid ring 51 to reveal in detail the lip 60 with a first face or lateral face 60a on one side and a second face, namely a beveled end face 60d on the other side of lip 60 with the lateral face 60a and the beveled end face 60d forming an included angle of less than 90 degrees therebetween. Similarly, a second lip 61 includes a first face or lateral face 61a on one side and a second face, namely, a beveled end face 61d on the opposite side with the lateral face 61a and the beveled end face 61d forming an included angle of less than 90 degrees therebetween. In addition, the beveled end face 60d intersects beveled end face 61d at an apex 61e to form a valley or V-shaped groove between the lip 60 on one face of the acid ring and the lip 61 on the opposite face of the acid ring 51. FIG. 7A also shows the lateral face 60a intersecting with the beveled end face 60d to form an apex 60f and the lateral face 61a intersects with the beveled end face 61d to form an apex 61f.

Figure 7B:
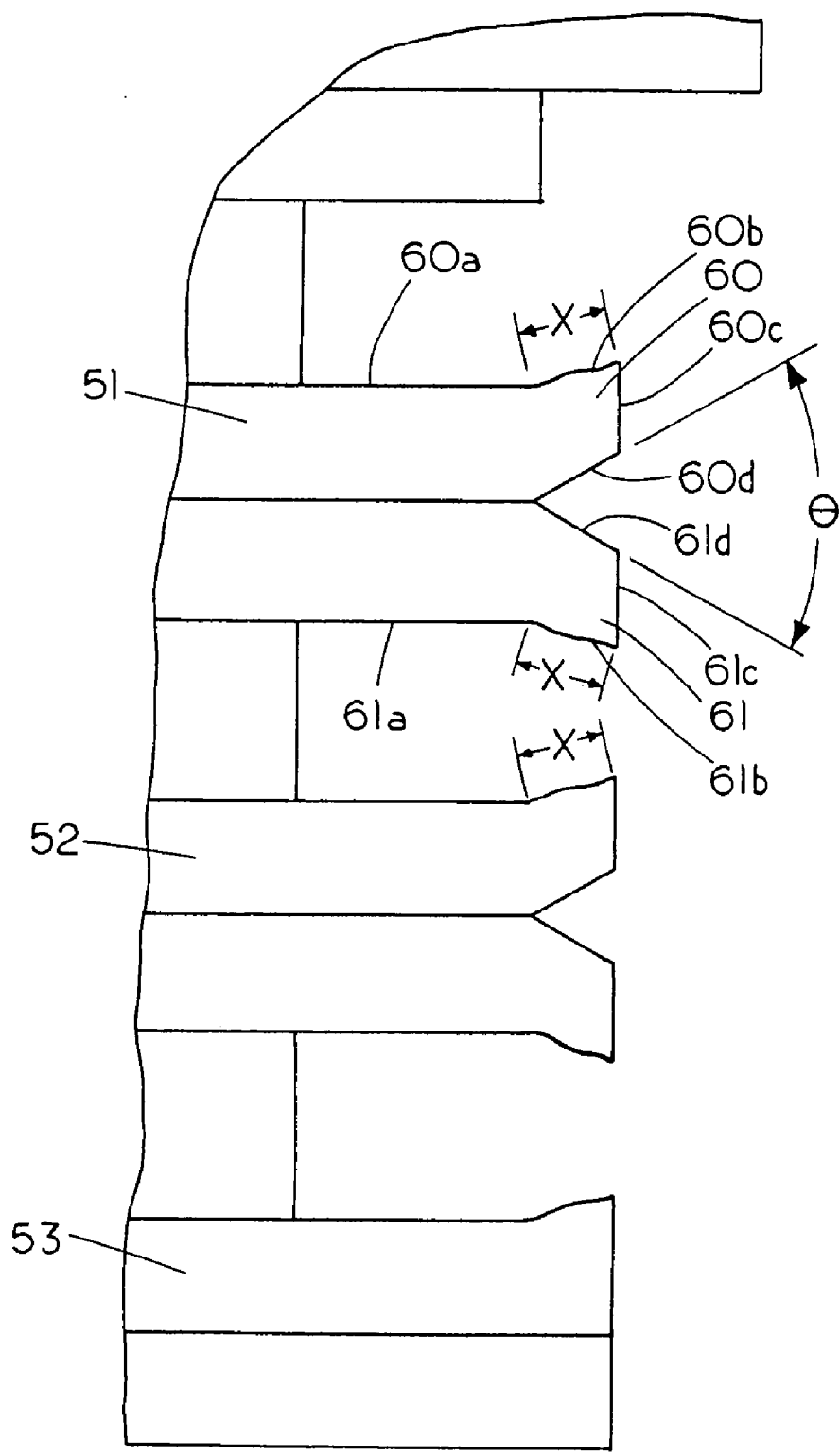
FIG. 7B is an enlarged view of a portion of the acid rings to reveal the beveled sealing surfaces on the acid ring.

FIG. 7B shows acid rings 51, 52 and 52 in a partial view in FIG. 7A with the lips in a flared condition to form a lateral sealing region or sealing bead on the lateral faces of the acid rings to thereby enhance the sealing of a battery container to the terminal. The beveled surface 60d of the first lip 60 and the beveled surface 61d of second lip 61 are located at approximately a ninety degree angle to each other although the angle can vary depending on the selection of the angle of the beveled surface for each lip. In the embodiments shown the lips 60 and 61 which were previously in an unflared condition (FIG. 7A) and an apex 60f and 61f have been transformed to a flared condition. The lip 60 has a an extended flat surface 60c and lip 61 has an extended flat surface 61c.

While FIG. 7A illustrates the acid ring in the unflared condition, FIG. 7B shows the acid rings in a flared condition. In the flared condition the lips on the bifurcated acid rings have been flared laterally to form a sealing region or sealing bead along the lateral faces of the acid rings.

FIG. 7A shows acid ring 51 in the as cast condition revealing lip 60 and lip 61 in an a straight or unflared condition. In the embodiments shown bifurcated acid ring 51 has a first lateral face 60a and a second lateral face 61 located in a substantially parallel relation ship to each other.

FIG. 7B shows bifurcated acid ring 51 in the flared condition. In the flared condition the bifurcated acid ring 51 includes a first circumferential end face 60c and a second circumferential end face 61c separated by a first circumferential beveled end face 60d and a second circumferential beveled end face 61d. In the flared condition a first circumferential sealing region or sealing bead 60b extends around the outer portion of lateral face 60a and a second circumferential sealing region or sealing bead 61b extends around the outer portion of lateral surface 61a. As can be seen in FIG. 7B the lip 60c located on the acid ring 51 and the lip 61 located on acid ring 51 have been flared upward to form the respective sealing regions 60b and 61b. The sealing regions have a lateral length denoted by x and extend partially along the lateral faces of the acid ring. Each of the sealing regions extend circumferentially around the battery terminal to provide a 360 degree sealing barrier between the container and the battery container.

Figure 8:
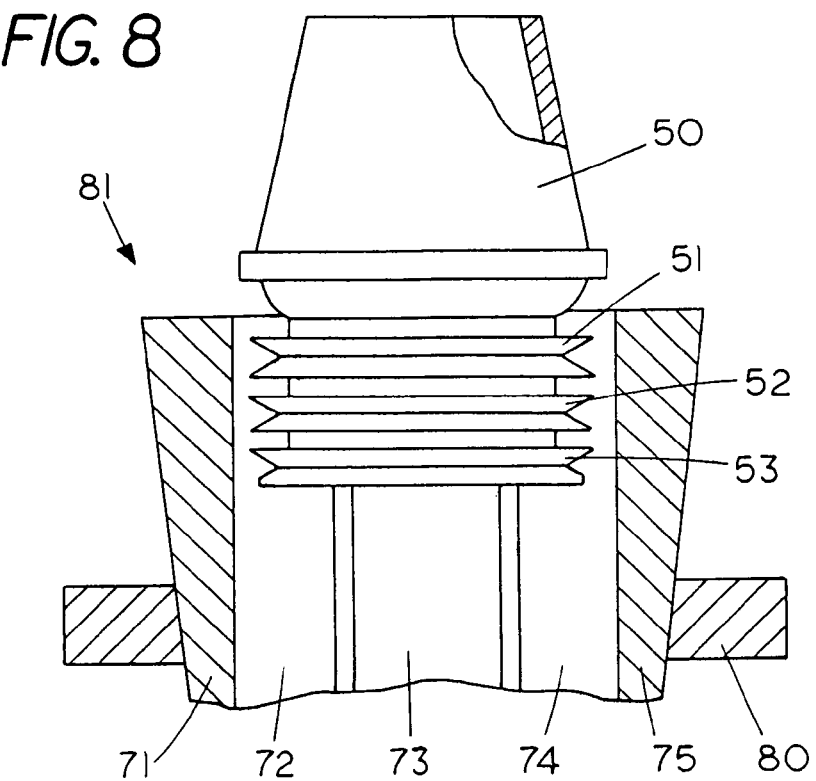
FIG. 8 is a partial side view of the battery terminal of FIG. 6 in a collet in an expanded condition.

In order to appreciate the transformation of the battery terminal with a bifurcated acid ring into a battery terminal with cantilevered sealing regions reference should be made to FIGS. 7 and 8 which shows a collet 81 in top view. FIG. 8 shows a section view the battery terminal 50 positioned between a set of cantilever mounted splines 71, 72, 73, 74 and 75 on the collet 81. FIGS. 7-10 illustrate a battery terminal placed in collet 81 and the collet collapsed to radially compress the lips on the acid ring to form a sealing bead on the lateral surface of the bead.

FIG. 7 shows a top view of the battery terminal 50 centrally positioned between the splines 71-77 that are cantilevered held in a base member (not shown). A compression collar 80 extends around each of the splines so that when the collar is forced upward the splines are brought radially inward to flare the lips on acid rings 51, 52 and 53.

FIG. 8 shows a section view of collet 81 surrounding battery terminal 50 with the splines 71, 72, 73 and 74 in a spaced condition about the bifurcated acid rings 51, 52 and 53. If desired a mandrel (not shown) can be inserted into battery terminal 50 to hold the battery terminal in postion.

Figure 9:
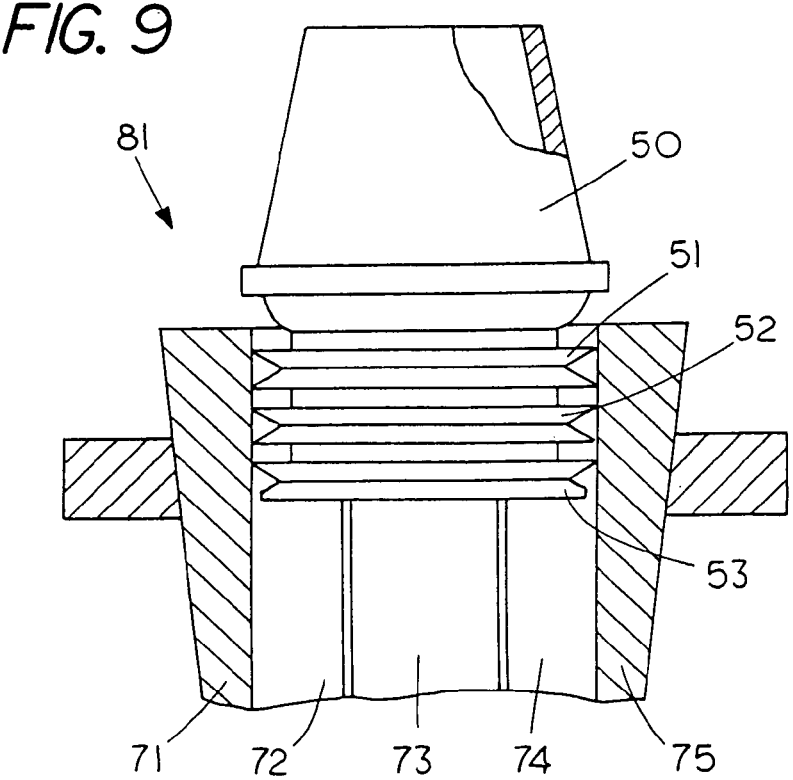
FIG. 9 is a partial side of the battery terminal and collet when the collet is partially contracted.

FIG. 9 shows the initial step in the formation of the sealing regions on the bifurcated acid rings 51, 52 and 53. In this condition the splines 71-75 have been brought into contact with the lips on the bifurcated acid rings 51, 52 and 53 while the acid rings are free to self center in the collet.

FIG. 10 shows the compression step wherein the splines 71-75 have been squeezed radially inward to flare the lips on acid rings 51, 52 and 53 sufficient to form a sealing bead on the lateral surface of each of the lips on the acid rings but insufficient to form the lips into a hook. That is the deformation, which is shown in greater detail in FIG. 7B, produces an inclined sealing region or sealing bead that extends along a portion of the backside of the flared lip of the acid ring. In the embodiment shown the radius of curvature of the collet and the radius of curvature of the acid rings are substantially equal so as to produce a uniform flaring of the lip.

FIG. 11 shows terminal 50 after compression by collet 81. As can be seen in FIG. 11 each of the lips on the acid rings 51, 52 and 53 have been flared to create the sealing regions illustrated in FIG. 7B. In contrast to the deformation of the rectangular shaped acid rings as shown in the prior art the compression of the bifurcated acid ring involves only a slight deflecting of the lips to create the sealing bead thus minimizing the stress lines that can be caused by the junction between a cold forming portion on a die cast battery terminal.

FIG. 12 is side view of an alternate embodiment of a battery part 80 wherein the acid rings 81, 82 and 83 are formed with a single lip on each acid ring. That is acid ring 81 has a lateral surface 81a and a beveled surface 81b that form an angle of less than 90 degrees and preferably 45 degrees of less so as form a lip that can be flared upward sufficiently to form a sealing bead on the lateral surface 81. In this embodiment the radial compression with the collet will form a top beveled sealing region on each lip to laterally restrain the container and simultaneously form an effective seal that inhibits the loss of electrolyte therepast.

We claim:

1. A method of making a battery part comprising:

casting the battery part with an acid ring with the acid ring having at least one flareable lip having a lateral surface and a beveled surface forming an acute angle with the lateral surface.

2. The method of making the battery part of claim 1 including the step of casting a battery terminal with a plurality of annular acid rings each having an annular lip separated by a groove located therebetween; and placing the battery terminal with the plurality of annular acid rings each having annular lip amongst particles that randomly impinge on the side surfaces of the acid rings to flare the lips of the acid rings to thereby form a protrusion for engaging a container.

3. The method of claim 1 wherein the battery terminal is placed in a fluidized bed with particles having a hardness greater than the hardness of the battery terminal.

4. A method of making a battery terminal comprising the steps of:

forming a plurality of acid rings each having a lip formed by a first lateral surface and a second surface with the first lateral surface and the second surface having an angle less than 90 degrees.

5. The method of claim 4 wherein the method of making the battery terminal comprises casting the battery terminal in a mold.

6. The method of claim 4 including impacting the second surface to flare the lip on the acid ring to form a sealing region on the lateral surface of the lip.

7. The method of making a battery terminal of claim 4 including forming a second lip on the acid ring with the second lip having a first lateral surface and a second surface with the first lateral surface and the second surface of the second lip having an angle less than 90 degrees.

8. The method of claim 4 including the making of the battery terminal from a lead alloy.

9. The method of claim 4 including impacting the second surfaces by radially striking the second surface to flare the lip to form a sealing bead on the lateral surface of the lip.

10. The method of claim 4 wherein the battery terminal is placed in a hopper containing free particles for randomly impinging on the second surface to thereby flare the lip.

11. The method of claim 4 wherein the second surface is impacted with a radial traveling peening member to thereby flare the lip to form a sealing bead on the lateral suffice for engaging a battery container.

12. The method of claim 7 wherein the second surface of the first lip and the second surface of the second lip are formed into a V-shaped groove.

13. The method of claim 12 including the forming at least three acid rings with each acid ring having at least two circumferential lips.

14. The method of claim 4 including the step of flowing molten metal into a cavity formed by radially movable side mold members and axially displaceable end mold members.

15. The method of claim 4 including the step of applying a radially compressive force sufficiently to flare the lip and form a sealing bead thereon but insufficient to bend the lip into a hook.

16. The method of claim 5 wherein the battery terminal is placed in a collet having a radius of curvature substantially the same as the radius of curvature of the acid ring and the collet is collapsed to radially compress the lip to form a sealing bead on the lateral surface of the lip.

* * * * *

UNITED STATES PATENT AND TRADEMARK OFFICE
CERTIFICATE OF CORRECTION

PATENT NO. : 7,338,539 B2
APPLICATION NO. : 10/804401
DATED : March 4, 2008
INVENTOR(S) : Ratte et al.

It is certified that error appears in the above-identified patent and that said Letters Patent is hereby corrected as shown below:

In column 2, line 51, delete "No. 6,644,084 Speigelberg" and insert -- No. 6,644,084, to Spiegelberg --, therefor.

In column 3, line 51, delete "DE4241393;" and insert -- DE4241393. --, therefor.

In column 6, lines 54-55, delete "postionable" and insert -- positionable --, therefor.

In column 7, line 50, after "has" delete "a".

In column 7, line 59, after "in" delete "an".

In column 8, line 34, delete "postion." and insert -- position. --, therefor.

Signed and Sealed this

Twenty-fourth Day of March, 2009

JOHN DOLL
*Acting Director of the United States Patent and Trademark Office*